(12) United States Patent
Karpenko

(10) Patent No.: US 11,741,927 B2
(45) Date of Patent: Aug. 29, 2023

(54) FRICTION DAMPED INSERT FOR HIGHLY STRESSED ENGINEERING COMPONENTS

(71) Applicant: Ford Global Technologies, LLC, Dearborn, MI (US)

(72) Inventor: Yuri Karpenko, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 17/108,712

(22) Filed: Dec. 1, 2020

(65) Prior Publication Data

US 2021/0082384 A1   Mar. 18, 2021

Related U.S. Application Data

(62) Division of application No. 16/209,432, filed on Dec. 4, 2018, now Pat. No. 10,854,184.

(51) Int. Cl.
| | |
|---|---|
| *G10K 11/162* | (2006.01) |
| *B29C 70/68* | (2006.01) |
| *F16F 7/00* | (2006.01) |

(52) U.S. Cl.
CPC ........... *G10K 11/162* (2013.01); *B29C 70/68* (2013.01); *F16F 7/00* (2013.01); *B29K 2995/0002* (2013.01); *B29K 2995/0091* (2013.01); *F16F 2226/04* (2013.01)

(58) Field of Classification Search
CPC ......... G10K 11/162; B29C 70/68; F16F 7/00; F16F 2226/04; B29K 2995/0002; B29K 2995/0091
USPC ........................................................ 428/131
See application file for complete search history.

(56) References Cited

U.S. PATENT DOCUMENTS

| | | | | |
|---|---|---|---|---|
| 2004/0011801 | A1* | 1/2004 | Rodriguez ............. | B65D 25/36 220/737 |
| 2015/0279345 | A1* | 10/2015 | Mathur ................ | G10K 11/162 181/294 |

* cited by examiner

*Primary Examiner* — Brent T O'Hern
(74) *Attorney, Agent, or Firm* — Lorne Forsythe

(57) ABSTRACT

A friction damped insert for highly stressed engineering components is disclosed. The disclosed inventive concept provides a method and system for increasing the damping capacity of an engineering system by adding a non-flat solid, highly damped insert to a system component that contributes most to the system's dynamic response. The insert can either be embedded into a system component during casting or be fastened to the system component outer surface. The insert is made of the single layer of flexible material by forming it into a rigid elongated body. The layer of material can be turned over on itself without folding to create a cylinder or can be folded over a number of times to create a prismatic bar. The layer of material may be shaped into a corrugated panel. The layer of flexible material may have a number of relatively small openings or perforations with a uniform spatial distribution.

8 Claims, 7 Drawing Sheets

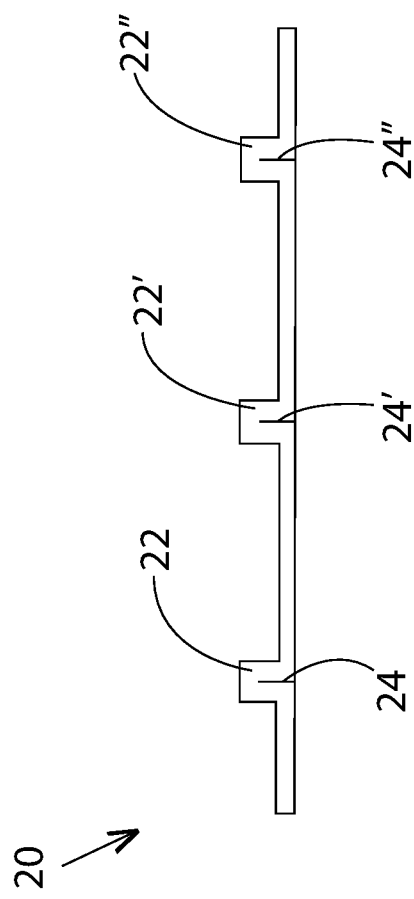
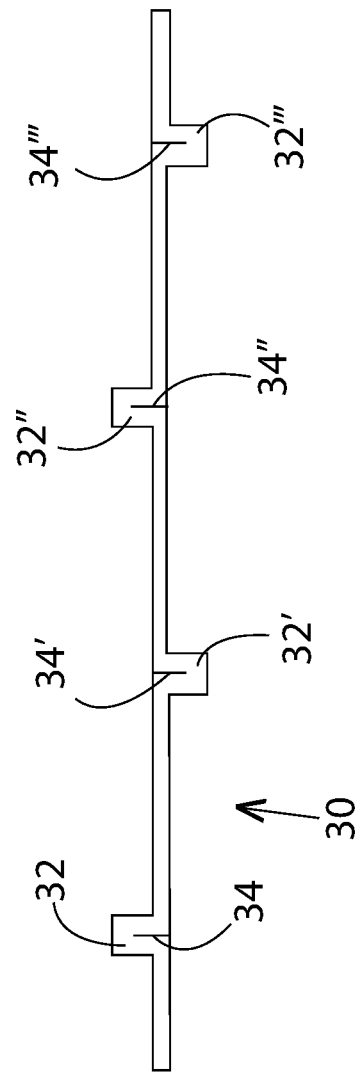

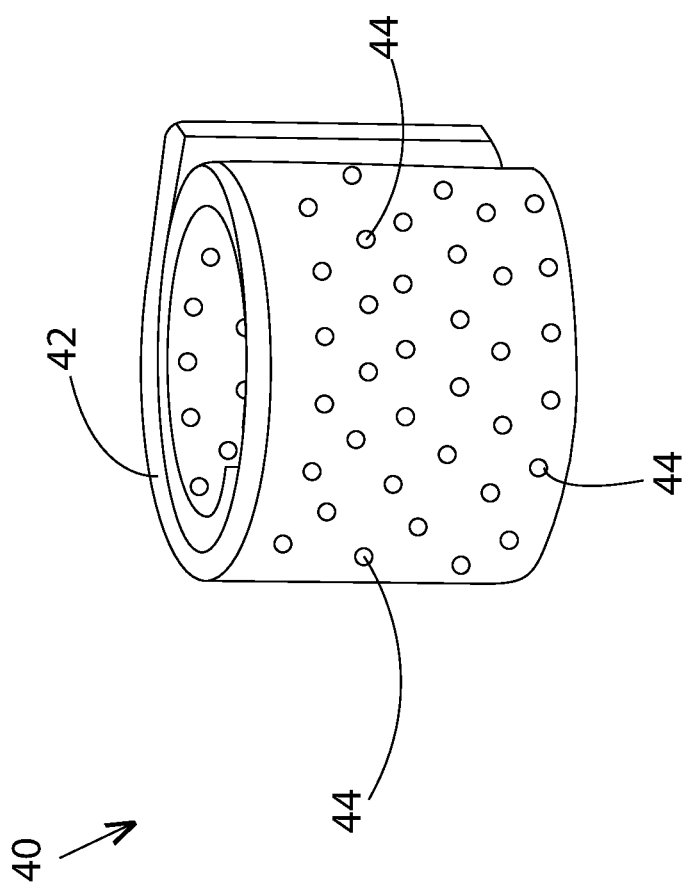

ial application of U.S.
FRICTION DAMPED INSERT FOR HIGHLY STRESSED ENGINEERING COMPONENTS

RELATED APPLICATION

The present application is a divisional application of U.S. Non-provisional application Ser. No. 16/209,432, filed Dec. 4, 2018 to which prior is claimed under 35 U.S.C. § 120 and of which the entire specification is hereby expressly incorporated by reference.

TECHNICAL FIELD

The disclosed inventive concept relates to dampening systems and methods of manufacturing such systems. More particularly, the disclosed inventive concept relates to such a system in which a non-flat solid, highly damped insert is embedded in a component during the molding process or is attached to a component. The system component in which the insert is embedded or is attached is a component that contributes significantly to the dynamic response of the system. The damped insert is made of a single layer of flexible material formed into a rigid elongated body having inner and outer surfaces. If the damped insert is embedded in the component during the molding process, the layer of material may have a number of relatively small openings or perforations to allow a limited infiltration of the molten casting material inside the layer of material for the additional spot rigid bonding between the component and insert inner surfaces during the casting process.

BACKGROUND OF THE INVENTION

A significant number of excessive noise and vibration problems in mechanical and civil engineering are caused by a mechanical system resonance which can occur whenever the natural frequency of vibration of a system coincides with the frequency of the external excitation. Mechanical system resonance may lead to excessive dynamic deflections which could cause not only undesirable noise and vibration but even a system failure. It is also known that coulomb friction develops from relative movement at the interface between the opposing solid surfaces.

Previous approaches to managing the relationship between frictionally damped structural components used embedded solid inserts that had only outer surfaces. Correspondingly, to develop sliding interface between the insert and the structural component, previous approaches proposed pre-treating the insert surfaces to avoid their complete bonding with the component surfaces during casting. However, while providing certain advantages, this can lead to insufficient overall bonding between the insert and component surfaces which may impact component structural integrity, representing a safety concern.

It is also known for engineers today to use Computer Aided Engineering (CAE) and Experimental Modal Analysis (EMA) tools to modify stiffness or mass of the system components to prevent the occurrence of a resonance. However, these procedures are expensive, time-consuming, and not 100% robust to the normal variations in parts associated with high-volume manufacturing. At the same time, the resonant vibration amplitude strongly depends on the overall damping of the system. With higher system damping, the resonant response of the system is lower. Materials that are commonly used for engineering structures have relatively low damping capacity. Correspondingly, the overall system damping typically is also low. Therefore, it would be highly beneficial to increase the internal damping capacity of the structural components that contribute most to the system dynamic deflections. This would robustly attenuate the system resonant vibration upon its development before it could produce noise in the system. Thus, a long-term concern for both customers and OEMs would be significantly reduced.

As in so many areas of engineering technology there is always room for measures that increase the damping capacity of engineering systems. A new approach that provides optimum damping capacity in an engineering system is desired.

SUMMARY OF THE INVENTION

The disclosed inventive concept provides a method and system for increasing the damping capacity of an engineering system by adding a non-flat solid, highly damped insert to a system component that contributes most to the dynamic response of the system. The solid insert can either be embedded into a system component during the casting process or be fastened to the system component outer surface by welding, gluing or by other means. The insert is made of the single layer of flexible material (e.g., metal or plastic) by forming it into a rigid elongated body having both inner and outer surfaces. For example, the layer of material can be turned over and over on itself without folding to create a cylinder or it can be folded over a number of times to create a prismatic bar.

In yet another example of the disclosed inventive concept, the layer of material can be shaped into a corrugated panel with some or all of the panel corrugations having opposing inner surfaces to be pressed together. Thus, if the insert body is subjected to dynamic loading, its vibrational energy may be dissipated by frictional contact at the corresponding inner surfaces. The spatial and cross-sectional configurations of the insert within the component can be adjusted to tailor its damping capacity to the component region that has the highest vibration amplitude during the system resonance.

To preserve the structural integrity of a component containing embedded insert, the outer surfaces of the insert are completely bonded to the component casting material during the molding process. According to another feature of this invention, the layer of flexible material may have a number of relatively small openings or perforations with a uniform spatial distribution. Their purpose is to allow a limited and local (i.e., just inside and in the immediate vicinity of the openings) infiltration of the molten casting material inside the layer of material for the additional spot rigid bonding between the component and insert inner surfaces during the casting process. The limited spot rigid bonding between the insert and component surfaces helps avoid the reduction in the contact pressure at the frictional interface between the inner surfaces of the insert due to their unavoidable thermal distortion during the component casting process. This arrangement also helps prevent undesirable differences in the temperature fields within the component and the insert during the system service life. Such differences might result in thermal distortion of the insert within the component which would negatively impact contact pressure between the insert inner surfaces.

It is known that friction damping has a preferred range of contact force (contact pressure) within which it becomes most effective. Below such an optimum range, excess relative motion at the interface develops without significant energy dissipation. Above it, excess contact pressure limits the development of relative motion for friction to act as an effective damper. Contact pressure between two opposing surfaces depends on their contact geometry and elastic properties which are influenced by the interface temperature and the corresponding temperature gradients. The operating temperature range for engineering systems is very wide (from −40° C. in cold climate areas during winter time up to 500° C. near the sources of heat). Since unwanted noise and vibration levels might occur during any temperature conditions, the change in the insert damping effectiveness with the component temperature should be minimized. The present invention achieves that by minimizing the variation between the temperature fields and their gradients inside the component and the insert as described above.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 2 is a cross section of a corrugated panel-like insert formed from the perforated layer of flexible material;

FIG. 3 is a cross section of another corrugated panel-like insert formed from the perforated layer of flexible material;

FIG. 4 is a cylindrical insert formed by a rolled layer of perforated flexible material;

DETAILED DESCRIPTION OF THE PREFERRED EMBODIMENT

Figure 1:
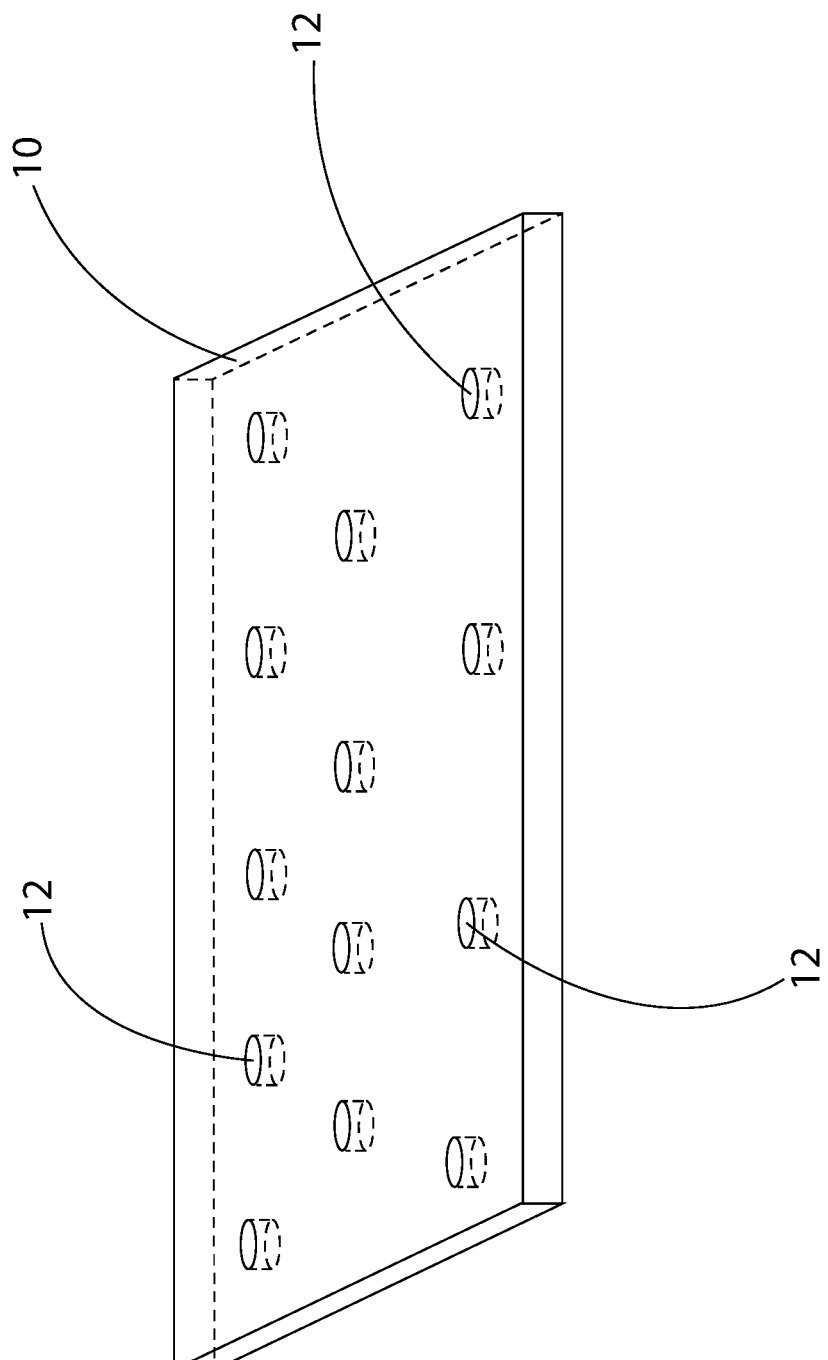
FIG. 1 is a perspective view of a single layer of flexible material having perforations prior to folding.

In the following figures, the same reference numerals will be used to refer to the same components. In the following description, various operating parameters and components are described for different constructed embodiments. These specific parameters and components are included as examples and are not meant to be limiting.

The accompanying figures and the associated description illustrate the construction of and method of making a non-flat solid, highly damped insert. The damped insert is preferably embedded in a component during the molding process. Alternatively, the damped insert may be attached to a component by any one of several methods of attachment. The damped insert of the disclosed inventive concept is attached to a component which plays an important role in the dynamic response of the system.

Figure 5:
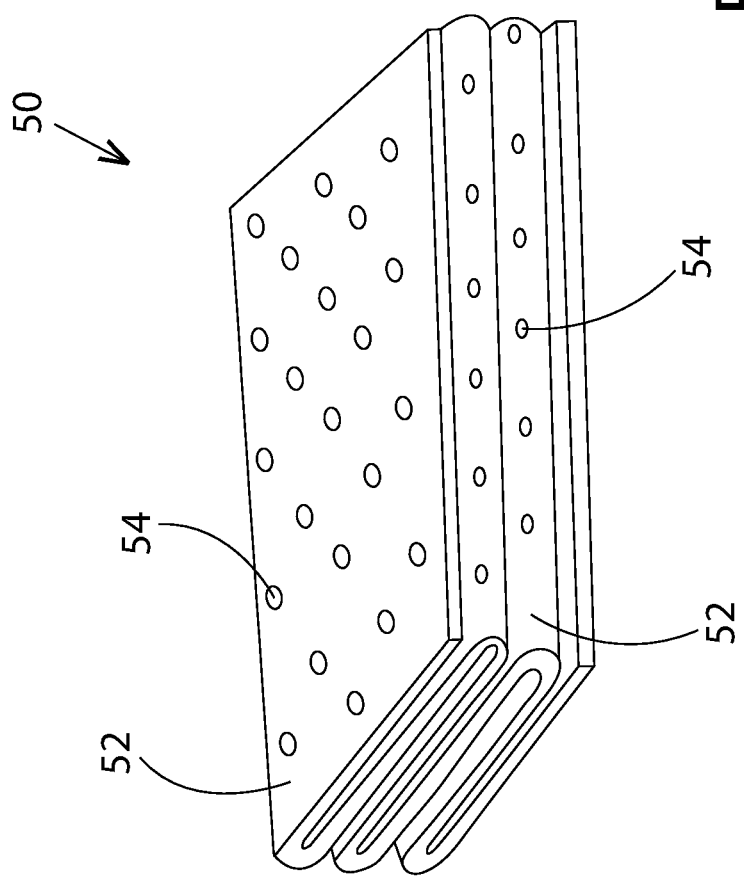
FIG. 5 is a rigid, elongated damped insert formed by folded layers of perforated flexible material.
Figure 6:
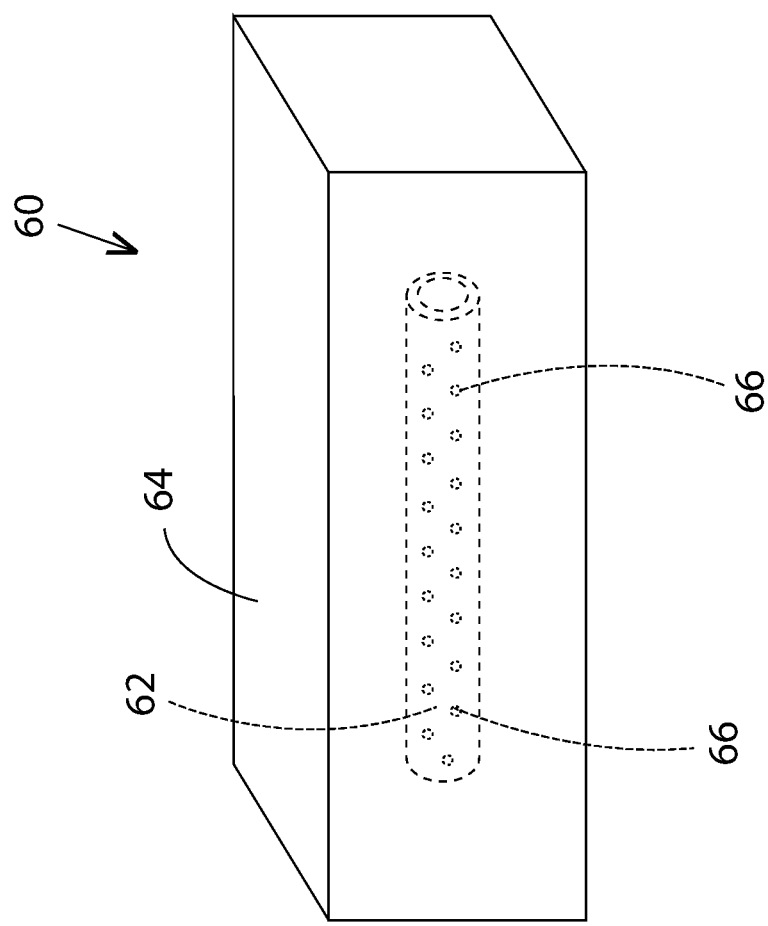
FIG. 6 is a perspective view of a beam-shaped component having a rolled damped insert embedded therein, the rolled damped insert being illustrated by dashed lines.
Figure 7:
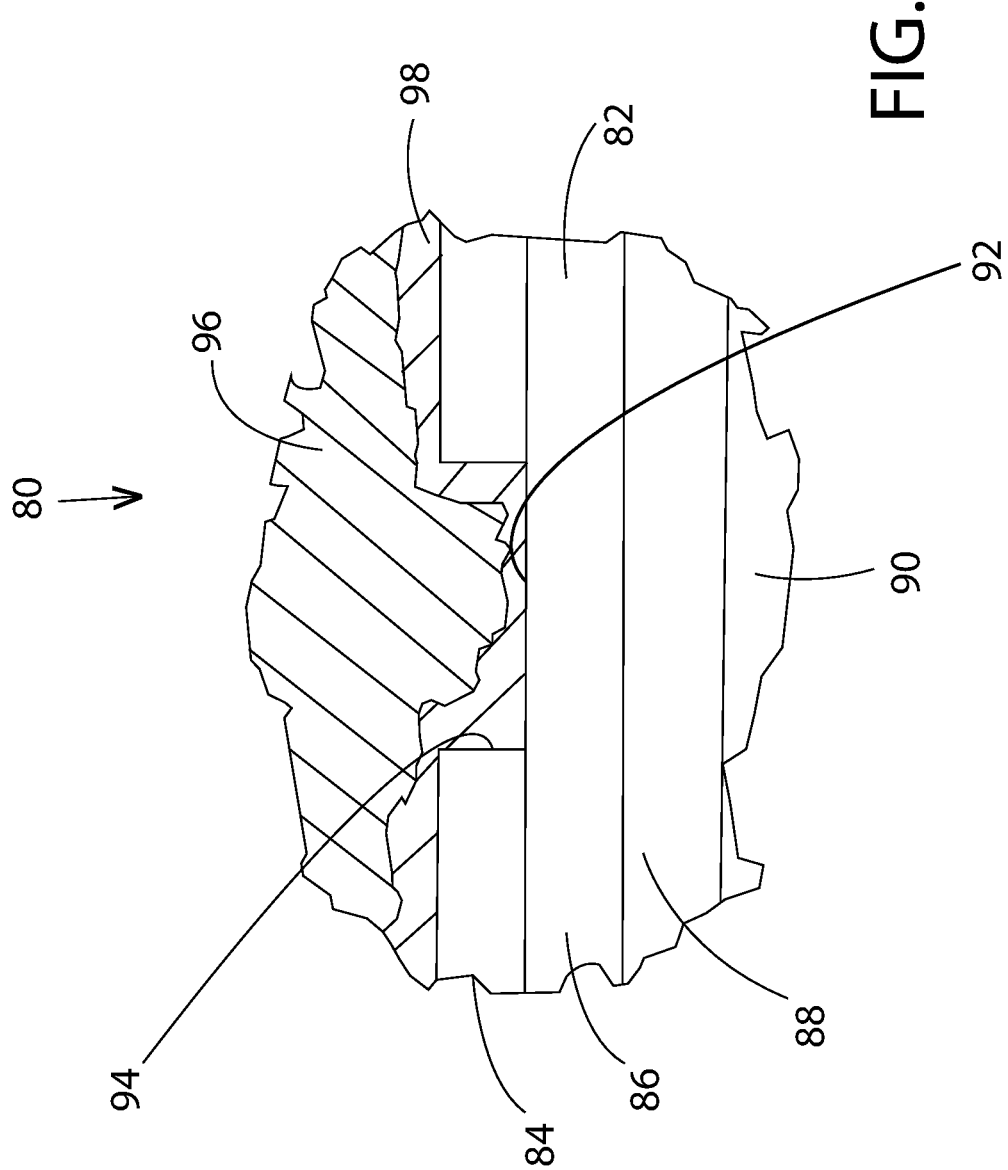
FIG. 7 is a sectional view of a portion of a cast component illustrating a perforation of the embedded damped insert in which molten component material entered the perforation and is bonded to the outer surface of the damped insert.
Figure 8:
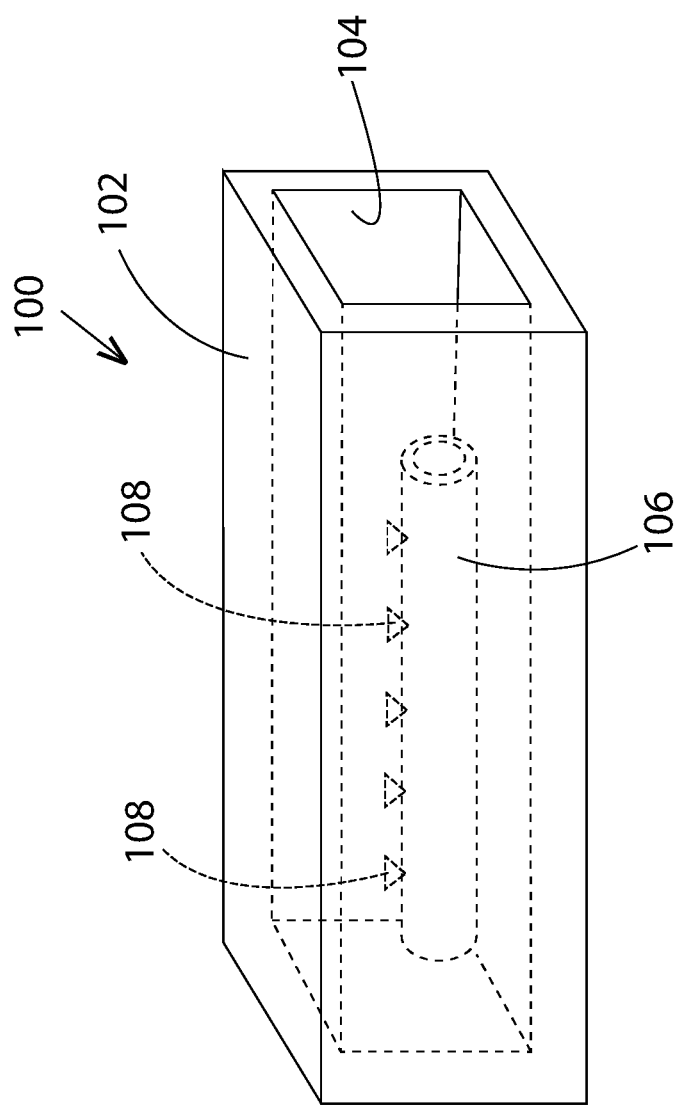
FIG. 8 is a perspective view of a beam-shaped component having a rolled damped insert attached to an inner surface thereof, the rolled damped insert being illustrated by dashed lines.

The accompanying figures are not intended as being limiting but instead are intended as being illustrative of the disclosed inventive concept. FIGS. 1 through 3 illustrate a damped insert in the form of a sheet having a plurality of perforations formed therein. FIGS. 4 and 5 illustrate the damped insert in the form of a perforated sheet in coiled and folded configurations respectively for use with a system component. As shown in FIGS. 4 and 5, a sheet of flexibly foldable or coilable material is used to make the depicted damped inserts. FIGS. 6 and 8 illustrate the formed damped insert in position cast within and attached to a system component respectively. A sectional view of a portion of a cast component in which molten component material entered the perforation and bonded to the outer surface of the damped insert is illustrated in FIG. 7.

The formed damped insert of the disclosed inventive concept may be used in any system component which would benefit by a damping element. Such a component may be used in virtually any industry in which vibration is an undesirable characteristic. Such industries include, without limitation, the transportation industry and the construction industry. Accordingly, reference to "system component" when used herein is to be given its broadest interpretation.

Referring to FIG. 1, a single layer of a flexible material is illustrated as 10. The single layer of a flexible material 10 may be composed of a variety of materials, including any one of several metals or plastics. The single layer of flexible material 10 includes a plurality of perforations 12 formed therein. The perforations 12 are preferably formed through the single layer of flexible material 10 to allow for the inflow of molten material as discussed below with respect to FIG. 7. The number, placement and size of the small openings or perforations 12 may be varied. The sizes of the small openings or perforations 12 may be consistent throughout the single layer of flexible material 10 or may be different. The number, placement and size of the small openings or perforations 12 may be readily adapted for any particular need and are thus an important feature of the tunability of the disclosed inventive concept. More particularly, and as a non-limiting example, the number of small openings or perforations 12 can be adjusted to allow for improved thermal expansion compatibility between the materials of the insert and the component that uses it.

A cross section of an exemplary corrugated panel-like insert, generally illustrated as 20, is shown in FIG. 2. The corrugated panel-like insert 20 includes a plurality of corrugations 22, 22' and 22". A greater or lesser number of corrugations may be adopted. In addition, while the corrugations 22, 22' and 22" are shown in FIG. 2 as being evenly spaced, such even spacing is not necessary.

Formed within the folded area of each of the corrugations 22, 22' and 22" is a frictional interface. Specifically, a frictional interface 24 is formed within the corrugation 22, a frictional interface 24' is formed within the corrugation 24', and a frictional interface 24" is formed within the corrugation 24".

While the corrugated panel-like insert may include corrugations formed on one side of the panel as is the case with the corrugated panel-like insert 20 illustrated in FIG. 2 and discussed in relation thereto, the corrugations may be provided on both sides of the panel. An example of such a construction is illustrated in FIG. 3 in which a cross section of an exemplary corrugated panel-like insert, generally illustrated as 30, is shown. The corrugated panel-like insert 30 includes a plurality of corrugations 32, 32', 32" and 32'. Like the corrugated panel-like insert 20 illustrated in FIG. 2, a greater or lesser number of corrugations may be adopted for use in the corrugated panel-like insert 30. Similarly, while the corrugations 32, 32', 32" and 32" are shown in FIG. 3 as being evenly spaced, such even spacing is not necessary.

Formed within the folded area of each of the corrugations 32, 32', 32" and 32" is a frictional interface. Specifically, a frictional interface 34 is formed within the corrugation 32, a frictional interface 34' is formed within the corrugation 34', a frictional interface 34" is formed within the corrugation 34", and a frictional interface 34'" is formed within the corrugation 34".

FIGS. 1 through 3 illustrate sheets formed from a flexible material for use in a rigid, elongated body having both inner and outer surfaces for use as a system component. FIGS. 4 and 5 illustrate the damped insert itself in different applications. Each sheet may be turned over and over onto itself by rolling or coiling without folding resulting in the damped insert or may be folded over a number of times to create, for example, a damped prismatic bar. It is to be understood that the illustrated applications are intended to be suggestive and not limiting.

With reference to FIG. 4, a coiled cylindrical insert, generally illustrated as 40, is shown. The coiled cylindrical insert 40 is formed from a coiled flexible material 42 that may be of virtually any thickness. A plurality of perforations 44 is formed in the coiled flexible material 42. A greater or lesser number of perforations 44 may be provided. In addition, the location and spacing of the perforations 44 may be different from the locations and spacing illustrated and may be of any configuration.

With reference to FIG. 5, a rigid and elongated damped insert formed by folded layers of perforated flexible material, generally illustrated as 50, is shown. The rigid and elongated damped insert 50 is formed from one or more segments of a layered and folded material 52 that may be of virtually any thickness. A plurality of perforations 54 is formed in the layered and folded material 52. A greater or lesser number of perforations 54 may be provided. In addition, the location and spacing of the perforations 54 may be different from the locations and spacing illustrated and may be of any configuration.

As noted, the damped inserts illustrated in FIGS. 4 and 5 are suggestive and not intended as limiting as other configurations may be adapted for use in the disclosed system. Regardless of its configuration, the damped insert, once formed, may either be embedded in a cast component or may be attached to a component. Both approaches to assembly help to achieve the goal of providing damping.

With reference to FIG. 6, a solid article, such as a beam-shaped component, is generally illustrated as 60. The beam-shaped component 60 includes an embedded cylindrical friction damped insert 62 embedded within a solid beam body 64. More than one embedded cylindrical friction damped insert 62 may be embedded within the solid beam body 64. The shape and size of the embedded cylindrical friction damped insert 62 as illustrated is only suggestive and is not intended as being limiting.

The embedded damped insert is embedded in the component during the molding process, the layer of material may have a number of relatively small openings or perforations 66 to allow a limited infiltration of the molten casting material inside the layer of material for the additional spot rigid bonding between the component and insert inner surfaces during the casting process. This arrangement is illustrated in FIG. 7.

Referring to FIG. 7, section of a cast component, generally illustrated as 80, is shown. The cast component 80 includes an embedded insert 82. The embedded insert may be of either the coiled cylindrical insert 40 or the rigid and elongated damped insert 50 illustrated in FIGS. 4 and 5 respectively and discussed in relation thereto. The embedded insert 82 includes multiple layers. As illustrated, the embedded insert 82 includes insert layers 84, 86, 88, and 90 of which the layer 84 is the outermost layer. The upper surfaces of the layers 82 and 84 define a bonding layer or outer insert surface 92. Small openings or perforations, of which one small opening or perforation 94 is illustrated, are formed in the outermost layer 84. The small openings or perforations 94 allow for the inflow of a molten material, such as a component bulk material 96, as discussed below.

As noted above with respect to FIG. 1, the number of small openings or perforations 94 can be adjusted to allow for improved thermal expansion compatibility between the materials of the insert and the component that uses it. Particularly, the number of openings may range from 0.1% up to 50% of the surface area of the outermost layer 94 of the embedded insert 82. This allows for adjustment of the thermal expansion properties between the materials of the bonding layer or outer insert surface 92 and the insert material removing the requirement for them to have similar coefficients of the thermal expansion. If the bonded materials have different coefficients of the thermal expansion they can develop cracks within their bonding layer and the insert material which can comprise the structural integrity of the component.

To prepare the cast component, the insert 82 is placed in the mold (not shown) and is held in position by an appropriate arrangement such as tabs. The molten component bulk material 96 is poured into the mold. Upon pouring of the molten material into the mold, a bonding layer 98 is formed that is bonded to the perforation and the associated outer insert surface 92 comprising the layers 82 and 84, thereby providing a strong attachment between the insert 82 and the surrounding component bulk material 96.

Optionally, the damped insert of the disclosed inventive concept may be attached to a component requiring damping as opposed to being cast in the component as illustrated in FIGS. 6 and 7 and as discussed in relation thereto. A component having a damped component attached thereto is illustrated I FIG. 8.

Referring to FIG. 8, a perspective view of a thin-walled beam-shaped component having attached cylindrical friction damped insert is generally illustrated as 100. The thin-walled beam-shaped component 100 comprises a thin-walled beam 102 having an interior 104 formed therein. A damped insert, such as a cylindrical damped insert 106, is attached to the interior 104 of the thin-walled beam 102. Attachment may be made at one or more attachment points 108 by any of several methods including, without limitation, welding or other mechanical fastening. It is to be understood that while it is illustrated that the attached insert is the cylindrical damped insert 106, any other damped insert according to the disclosed inventive concept may be adapted for use with the component. It is also to be understood that it is not necessary for the damped insert 106 to be attached to the interior 104 of the thin-walled beam 102. Instead, the damped insert 106 may be fixed to the outside of the component.

The damped insert of the disclosed inventive concept may be used in an environment where damping is necessary and finds particular application in a highly stressed engineering component. For example, as a non-limiting example, the disclosed inventive concept may be used in the automotive industry to dampen brake drums and brake rotors.

One skilled in the art will readily recognize from such discussion, and from the accompanying drawings and claims that various changes, modifications and variations can be made therein without departing from the true spirit and fair scope of the invention as defined by the following claims.

What is claimed is:

1. A method for forming a damped component, the method comprising:
   forming a friction damped insert associated with a component body, said friction damped insert being formed from a sheet of flexibly foldable or coilable material, said sheet of flexibly foldable or coilable material having first and second sides and being folded to form a prismatic bar or coiled into a configuration of a non-flat elongated body or formed into a corrugated shape, said sheet of flexibly foldable or coilable material having a plurality of perforations formed therein that are configured to allow molten material to flow therein;
   forming a component to be damped; and
   attaching said friction damped insert to said component to be damped.

2. The method for forming the damped component of claim 1, including forming a component mold, positioning said friction damped insert in said mold, and introducing a molten component bulk material into said mold to surround said friction damped insert and to infuse a portion of said molten component bulk material into said plurality of perforations.

3. The method for forming the damped component of claim 1, wherein said sheet of flexible foldable or coilable material is selected from the group consisting of a metal and a plastic.

4. The method for forming the damped component of claim 1, wherein said plurality of perforations extend between said first side and said second side of said sheet of flexible foldable or coilable material.

5. The method for forming the damped component of claim 1, wherein said sheet of flexible foldable or coilable material is folded over itself in the shape of a prismatic bar.

6. The method for forming the damped component of claim 1, wherein said sheet of flexible foldable or coilable material is formed into a corrugated having that includes at least one corrugation, said at least one corrugation having a frictional interface.

7. The method for forming the damped component of claim 6, wherein said at least one corrugation comprises a plurality of corrugations, each of said plurality of corrugations being formed on one side of said first side or said second side.

8. The method for forming the damped component of claim 6, wherein said at least one corrugation comprises a plurality of corrugations, each of said plurality of corrugations being formed on both said first side and said second side.

* * * * *